US011907916B2

(12) United States Patent
Khaund

(10) Patent No.: US 11,907,916 B2
(45) Date of Patent: Feb. 20, 2024

(54) DIGITAL SECURITIZATION, OBFUSCATION, POLICY AND COMMERCE OF EVENT TICKETS

(71) Applicant: Live Nation Entertainment, Inc., Beverly Hills, CA (US)

(72) Inventor: Sanzib Khaund, Walnut Creek, CA (US)

(73) Assignee: Live Nation Entertainment, Inc., Beverly Hills, CA (US)

( * ) Notice: Subject to any disclaimer, the term of this patent is extended or adjusted under 35 U.S.C. 154(b) by 38 days.

(21) Appl. No.: 17/688,598

(22) Filed: Mar. 7, 2022

(65) Prior Publication Data

US 2022/0188779 A1 Jun. 16, 2022

Related U.S. Application Data

(63) Continuation of application No. 16/283,506, filed on Feb. 22, 2019, now Pat. No. 11,270,271, which is a
(Continued)

(51) Int. Cl.
*G06Q 20/04* (2012.01)
*H04L 9/32* (2006.01)
(Continued)

(52) U.S. Cl.
CPC ....... *G06Q 20/045* (2013.01); *G06Q 20/3829* (2013.01); *H04L 9/3236* (2013.01);
(Continued)

(58) Field of Classification Search
CPC ............. G06Q 20/045; G06Q 20/3829; G06Q 2220/00; H04L 9/3236; H04L 9/3297; H04L 9/50; H04W 12/08
See application file for complete search history.

(56) References Cited

U.S. PATENT DOCUMENTS 6,161,183 A 12/2000 Saito et al.
7,093,130 B1 8/2006 Kobayashi et al.
(Continued)

FOREIGN PATENT DOCUMENTS

| CN | 103914907 A | * 7/2014 |
| CN | 105681301 A | 6/2016 |
| CN | 105592098 B | 9/2018 |

OTHER PUBLICATIONS

"Application Binary Interface Compatibility Through a Customizable Language", Kevin Jay Atkinson, University of Utah, Dec. 2011 (Year: 2011).*

(Continued)

*Primary Examiner* — Duan Zhang
(74) *Attorney, Agent, or Firm* — MUGHAL GAUDRY & FRANKLIN PC

(57) ABSTRACT

The present disclosure provides systems and methods that may convert traditional tickets into secure digital assets protected by cryptographic public/private keys that deploy these tickets on a blockchain. By structuring these tickets as smart digital contracts, such system can act as a self-policing escrow while simultaneously allowing ticket issuers greater control over the tickets after the tickets leave the ticket issuers' possession. The system can incorporate specific capabilities into the digital assets to provide an increased level of multiple ownership, security granularity, and sales restrictions in ticket transactions.

20 Claims, 5 Drawing Sheets

Related U.S. Application Data continuation of application No. PCT/US2017/048256, filed on Aug. 23, 2017.

(60) Provisional application No. 62/379,099, filed on Aug. 24, 2016.

(51) Int. Cl.
*G06Q 20/38* (2012.01)
*H04L 9/00* (2022.01)

(52) U.S. Cl.
CPC ....... *H04L 9/3297* (2013.01); *G06Q 2220/00* (2013.01); *H04L 9/50* (2022.05)

(56) References Cited

U.S. PATENT DOCUMENTS

| | | | |
|---|---|---|---|
| 7,841,525 B1 | 11/2010 | Zhou | |
| 2003/0236736 A1* | 12/2003 | Harmon | G06Q 40/04 705/37 |
| 2010/0228576 A1 | 9/2010 | Marti et al. | |
| 2014/0095226 A1* | 4/2014 | Kourkoumelis | G06Q 10/02 705/5 |
| 2014/0100896 A1* | 4/2014 | Du | G06Q 10/02 705/5 |
| 2014/0237368 A1* | 8/2014 | Canitz | G06F 3/167 715/729 |
| 2015/0088563 A1* | 3/2015 | Bergdale | G06Q 20/322 705/5 |
| 2015/0278820 A1* | 10/2015 | Meadows | G06F 21/32 705/64 |
| 2015/0348169 A1 | 12/2015 | Harris et al. | |
| 2015/0356524 A1 | 12/2015 | Pennanen | |
| 2016/0080390 A1* | 3/2016 | Kalb | G06Q 50/01 726/4 |
| 2016/0098730 A1 | 4/2016 | Feeney | |
| 2017/0048209 A1* | 2/2017 | Lohe | H04L 9/14 |
| 2018/0028595 A1* | 2/2018 | Isakson | A61P 9/00 |

OTHER PUBLICATIONS

Tschorsch et al., "Bitcoin and Beyond: A Technical Survey on Decentralized Digital Currencies," IEEE Communications Surveys & Tutorials, vol. 18, No. 3, Third Quarter 2016, pp. 2084-2123 (40pages).

Tang, "How Do Commercial Banks Win Mobile Terminal Users in the Era of Internet Finance", China Financial Computer No. 8, Aug. 7, 2016, pp. 81-85 (5 pages). No translation available.

* cited by examiner

DIGITAL SECURITIZATION, OBFUSCATION, POLICY AND COMMERCE OF EVENT TICKETS

CROSS-REFERENCES TO RELATED APPLICATIONS

This application is a continuation of U.S. patent application Ser. No. 16/283,506, filed Feb. 22, 2019, which is a bypass continuation of International Application No. PCT/US2017/048256, filed on Aug. 23, 2017, which claims the priority benefit of U.S. Provisional Application No. 62/379,099, filed on Aug. 24, 2016, the disclosures of each of which are entirely incorporated herein by reference for all purposes.

BACKGROUND OF THE INVENTION

Live events transact tens of billions of dollars of tickets in a given year. Between sporting events, concerts, and theatrical productions, commercial events traditionally require a ticket to guarantee entry for a prospective attendee. For years, paper tickets were the standard. Tickets are often printed on expensive paper stock with elaborate graphic designs that make forgeries expensive and easier to spot. Advances such as holograms made counterfeiting even more difficult, though not entirely impossible.

In the 2000s, as digital technologies and personal computing emerged, the ticketing industry began to adopt printable tickets. Some of these were documents that could be printed at home, enabling instant delivery through email, and negating the need for postal mail or any actual physical distribution of the tickets. The growth and adoption of mobile devices made digital tickets even more prevalent, not only enabling those same digital documents to be copied but also utilizing technology such as a digital wallet to hold these tickets and specifically the barcode required to gain entry into the venues.

While digital delivery and redemption provided a level of convenience far greater than that of paper tickets, it also created a huge security issue. Digital assets have had a long history of piracy, ranging from copies of computer software to digital music files that were pirated via peer-to-peer services. The rise of Internet conductivity enabled increased number of bad actors to participate in the piracy of these digital tickets. Because the main component of the ticket is the barcode, which may be defined by a character string no longer than 10 symbols, for example, reproducing the tickets may be simpler than that of a software application or a digital audio file. Because no effort is made to obscure these codes, the ability to reproduce them is remarkably simple.

With over 250 ticket exchanges available, for example, one user may theoretically sell a ticket 250 times. Every sale seems authentic because a ticket is not invalidated until it is scanned at the venue on the day of the event. Until then, it is difficult to check if anyone else is carrying the ticket. On the day of the event, the first person to scan the ticket will gain admission to the event. However, the other 249 ticket buyers will be rejected at the door with invalid tickets. The lack of trust between players has required third party intermediaries to "guarantee" transactions to indemnify the ticket buyer in case of a fraud. However, this does not solve the core problem. These intermediaries focus on their business of creating a marketplace while providing little more than an insurance policy to victims.

BRIEF SUMMARY OF THE INVENTION

It may be helpful to take a digital asset and protect it from duplication. Unlike common approaches like a plain digital document or print-at-home barcodes, tickets need to maintain a singularity while still maintaining the flexibility and modularity of digital tickets. These tickets cannot be simply copied or transferred without the express consent of the owner of the ticket. Advances in computer-based cryptography schemes popularized by the internet currency Bitcoin has given rise to immutable digital assets that can serve as the core of a system that ensures that there is only one copy and one rightful owner of each ticket. This application is directed to a system that converts these tickets into secure digital assets that not only protect tickets against fraud, but also increase the control, ownership policies, and flexibility of these tickets. The system draws on the core attributes and technologies that has made Bitcoin a viable currency, but enables these added features by employing a distributed code structure made possible by specific blockchain designs. These features create an improved approach over a traditionally static item that reinvents the value proposition of a ticket as a dynamic extended-life component of the live event experience while conferring more power to the event owners to manage their events more effectively.

In an aspect, the present disclosure provides a computer-implemented method for creating cryptographically secure digital assets. The system may comprise: receiving, over a ticket management network, ticket information regarding an event ticket, including a ticket identifier and an event identifier, from a ticket issuing system; creating a digital ticket for the event ticket based on the ticket information, wherein the digital ticket maintains a state, and wherein the digital ticket encodes a set of policies governing one or more ticket transactions of the event ticket; deploying, over the ticket management network, the digital ticket to a blockchain system that implements cryptographic contract protocols, such that the one or more ticket transactions are supported by the implementation; and storing, in a database, a reference to the deployed digital ticket on the blockchain system.

The one or more ticket transactions may require a public key and a private key, wherein the public key is required to be able to perform read operations on the digital ticket and the private key is required to transact for the ticket. In some embodiments, the public key and the private key is generated by the blockchain system.

In some embodiments, the deployed digital tickets become distributed applications, wherein the distributed applications are configured to manage state information, stored values, business rules, and functionality from other applications via an application interface.

The one or more ticket transactions may include a transfer, an exchange, or a redemption.

In some embodiments, the set of policies enforces single-user ownership and multi-role access of the event ticket, and wherein the state indicates the current owner of the event ticket.

In some embodiments, for an added value associated with the event ticket, the digital ticket encodes a set of rules governing value transactions of the added value.

In some embodiments, the set of policies enforces spatial and temporal requirements. The spatial requirements may include obtaining and confirming GPS coordinates of the location of the one or more ticket transactions.

In some embodiments, the blockchain system further comprises smart groups, wherein the smart groups are distributed applications configured to validate actions or enforce ownership restrictions on the digital tickets.

In some embodiments, the ownership restrictions include a list of individuals or groups, and wherein the smart groups are configured to ensure that the final digital ticket holder belongs to the list.

In another aspect, the present disclosure provides a computer-implemented method for managing cryptographically secure digital assets. The method may comprise: retrieving a digital ticket on a blockchain system corresponding to an event ticket issued by a ticket issuing system, wherein the digital ticket maintains a state that indicates a current owner and a transfer status of the event ticket, wherein the digital ticket encodes a set of policies governing one or more ticket transactions of the event ticket, and wherein the blockchain system implements cryptographic contract protocols, such that the one or more ticket transactions are supported by the implementation; when the transfers status equals a value specified by the set of policies, causing the event ticket to be available for transfer in an open online market; and, in response to a transfer transaction of the event ticket in the open online market, updating the current owner and the transfer stratus indicated in the state in accordance with the transfer.

In another aspect, the present disclosure provides a non-transitory computer-readable medium comprising machine-executable code that, upon execution by one or more computer processors, implements any of the methods above or elsewhere herein.

In another aspect, the present disclosure provides a system comprising one or more computer processors and a non-transitory computer-readable medium (e.g., computer memory) coupled thereto. The non-transitory computer-readable medium comprises machine-executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION OF THE INVENTION

Figure 1:
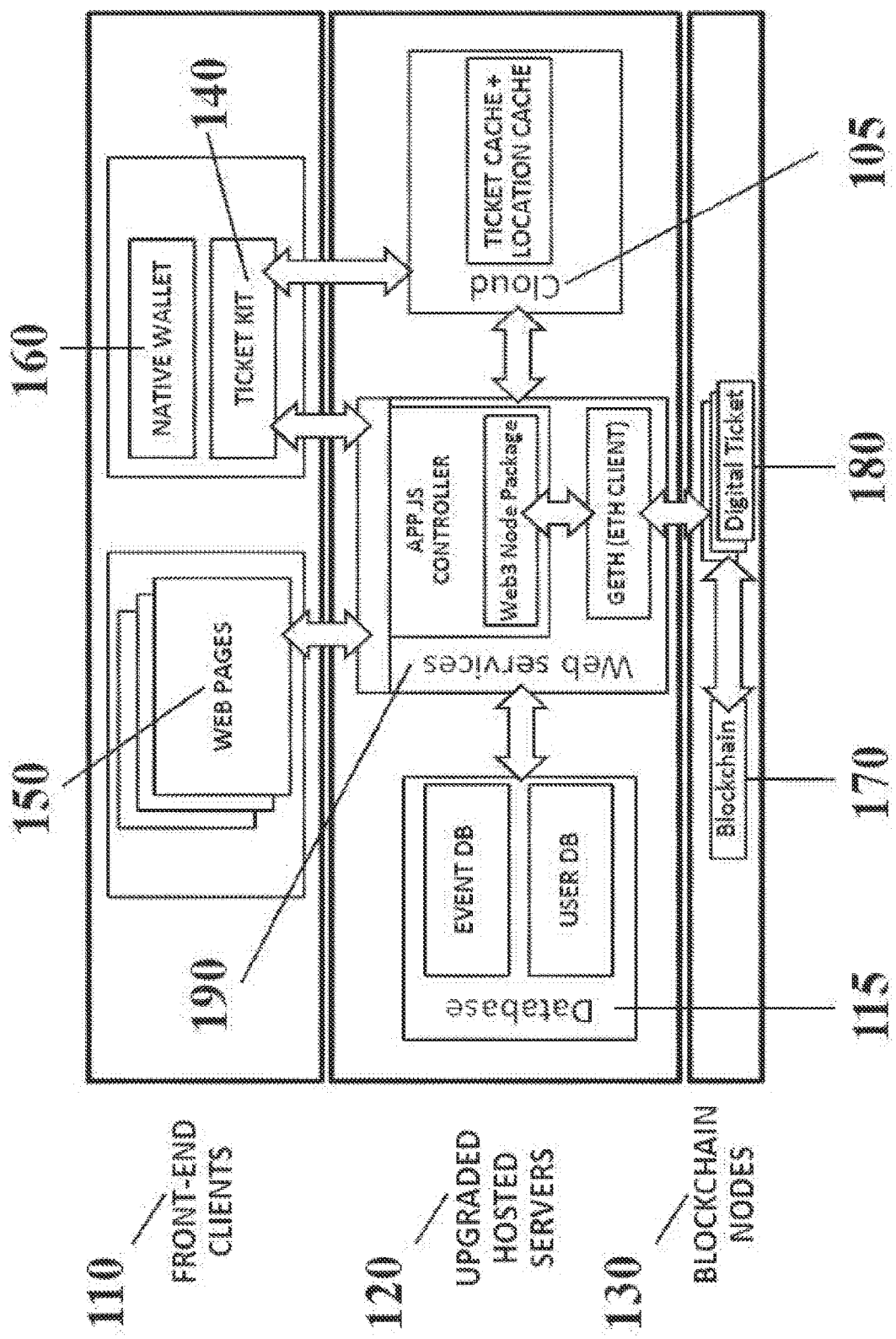
FIG. 1 illustrates a system architecture according to some embodiments described herein.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "current owner," as used herein, generally refers to the owner of an item (e.g., event ticket) at a given point in time. The ownership of the item may change with time.

The application is directed to an event ticket securitization system and related methods that convert a traditional ticket into an immutable digital asset that can only be surrendered or redeemed by an authorized assignee. Through the use of cryptographic key pairs, the sale or exchange of tickets can be conducted in a highly secure and highly transparent manner without the requirement of a third-party intermediary. In some cases, the system draws from a blockchain, an open ledger that addresses the double-spending problem using a peer-to-peer distributed timestamp server to generate computational proof of the chronological order of transactions. A blockchain is secure as long as honest nodes collectively control more CPU power than any cooperating group of attacker nodes. Transactions that are computationally impractical to reverse may protect sellers from bad actors who may attempt to act on their behalf, and routine escrow mechanisms are implemented to protect buyers.

To leverage a blockchain for tickets, each ticket may undergo a tokenization and securitization process, which includes the obfuscation of the barcode that is required for entry. The barcode may not include any identifying information of an owner of a ticket. Every ticket may have a set of principals who have different levels of access to the ticket, similar to authorization roles in operating system security (i.e., Administrators, Super Users, Users, and Guests). The ticket issuer, the ticket administrator (in this case, the party associated the system), and the ticket owner each may have authorization to perform various transactions on the ticket. Meanwhile, "guest" users can access information about the ticket, including confirming ownership of the ticket to build trust in a potential transaction.

System Components

The system may be comprised of several objects that play a role in the securitization of the ticket as well as all subsequent transactions, including the transfer, resale, and redemption of the ticket.

Blockchain

The system may rely on a blockchain-based computing platform that distinguishes itself from the Bitcoin blockchain by enabling "smart contract" functionality. An example of such a blockchain-based computing platform is Ethereum™. In some cases, the computing platform provides a decentralized virtual machine that executes peer-to-peer contracts using a cryptocurrency. These contracts are applications that run exactly as programmed without any possibility of downtime, censorship, fraud, or third party interference. They may operate on this blockchain ("the blockchain"), a powerful shared global infrastructure that can move value around and represent the ownership of property. This generally enables developers to create markets, store registries of debts or promises, move funds in accordance with instructions given long in the past (like a will or a futures contract) and many other things that have not been invented yet, all without a middle man or counterparty risk.

As tickets are "tokenized" on the blockchain, they may be much more than tokens. They may become "DApps" (Distributed Applications), complete with state, stored values, business rules, and functionality from other applications via an exposed interface. They may achieve an app-object duality, encompassing the best features of both. This may enable the core functionality of the ticket as well as the extensibility of the ticket.

Users and Aliasing

Every user may be identified by a "public key", such as a globally unique 40-digit hex address, that is generated by the blockchain along with a "private key". The public key is generally the equivalent to a username and can be used to identify and accept transfers at any time. The private key generally represents the password and should be guarded carefully and accessible only by the user, either via a secure wallet (similar to Bitcoin wallets) external to the system or an ultra-secure data store that can be accessed via alternate credentials (see aliasing below). A transaction can only be authorized by the owner of the public key associated with the private key. This draws from the inherent capabilities of blockchains, where public and private keys are cryptographically created.

The system allows the public key to be aliased against a series of foreign identities not associated with the system, such as OAuth-compliant systems with associated email addresses, social network IDs, and so on as well as phone numbers. In each case, an authentication process may confirm authorization and ties the foreign account to the public key in a many-to-one relationship in a key-value store. This aliasing may allow a user's foreign address to be declared as a recipient of a ticket by any other user in the system. It may also authorize a valid challenge of the foreign credentials to allow access to the private keys when transactions are submitted by creating a secure data store that will confirm federated authentication before surrendering private keys. From the user experience perspective, all keys are generally masked by their aliased foreign identities. The acquisition and application of the private key will generally be invisible to the user, who may not need the key if they are using aliases.

Digital Ticket

As discussed above, a ticket in the system may be implemented as a DApp that sits on the blockchain. Similar to the Bitcoin, the system may allow the ticket to be modified by its owner.

Unlike the Bitcoin which is strictly defined by its one owner, there are many types of transactions that can be performed with a ticket in the system across many owners. The blockchain is generally not responsible for just identifying ownership of the ticket, but any transaction that may alter the state of the ticket. See "Anatomy of a ticket" below for more information.

Digital Ticket Wallet

Once a user object is created, it can link to a virtual wallet, which is a collection of tickets that are owned by the specific user. The wallet may be an array of references to addresses that represent each ticket on the blockchain. The relationship is generally reflexive: the wallet may track the assets owned by the user, while the asset may store the user address and authorizes a set of activities for that user to do, including transferring or redeeming the ticket.

Smart Groups

Smart Groups may also be DApps that sit on the blockchain. However, their primary purpose is generally to serve as an interactive component to validate actions or enforce ownership restrictions. An authorized entity, designated at the creation of the group, can manage adding or removing users from the list. Anyone can programmatically query the list to verify if a specific User belongs to the group. Therefore, when a Ticket is restricted to a specific group, the Smart Group DApp can be queried to confirm membership before the transaction is consummated.

Helper Caches

Most operations on tickets don't require transactions. They are reading operations. However, using these helper caches as complementary data stores may reduce the compute resources burden on the blockchain, speed up data access times, and employ scalable web sockets to propagate information updates more effectively.

System Application Architecture

FIG. 1 illustrates the system architecture. The overall system may be split into three tiers or layers: the client tier 110, the application/middleware tier 120, and the blockchain tier 130.

Blockchain Tier

The blockchain tier 130 may comprise the blockchain 170 and the digital tickets 180. The blockchain 170 may hold each of the digital tickets 180, constructed as a "smart contract" that embeds the full functionality of a ticket. This layer 130 may serve as the ultimate arbiter of the tickets ownership and also provides a chronology of the tickets transactions to be able to identify who has owned the ticket when. Implementation-wise, the ticket can be created as a template, packaged into the corresponding byte codes, and posted to the blockchain, typically through a remote procedure call. The tunnel into the blockchain is managed in this architecture by and a special client.

Application/Middleware Tier

The application tier 120 may connect to the client tier 110 and abstract out calls (remote procedure calls, web services calls 190, etc.) for the blockchain. The application tier 120 may also perform validation on those calls and relay them to the block chain 170. The application tier also may orchestrate multiple services, draw additional data from external web stores-including a database system 115 and a cloud computing platform 105—and handle exceptions gracefully.

Client Tier

The client tier 110 may represent the accessible interface for ticket customers. Because of the application tier's interface, an infinite number of clients can be written against the inventory of tickets managed by the ticket kit 140. This includes mobile webpages 150 as well as a digital wallet interface 160. In addition, the client tier 110 can be given direct access to the helper cache on the cloud computing platform 105, which allows real-time updates/notifications of ticket inventory for the user and reduce the burden on the application tier 120.

Anatomy of a Ticket

As described earlier, the ticket is not implemented as a simple token but may be implemented as a full application that maintains state, imposes security constraints, enforces policies and business rules, and manages intrinsic variables. Where previous digital tickets simplified ticket complexity to the level of practically promoting counterfeiting schemes, the digital tickets employed in this system are generally structured to maximize safety, security, and extensibility.

Figure 2:
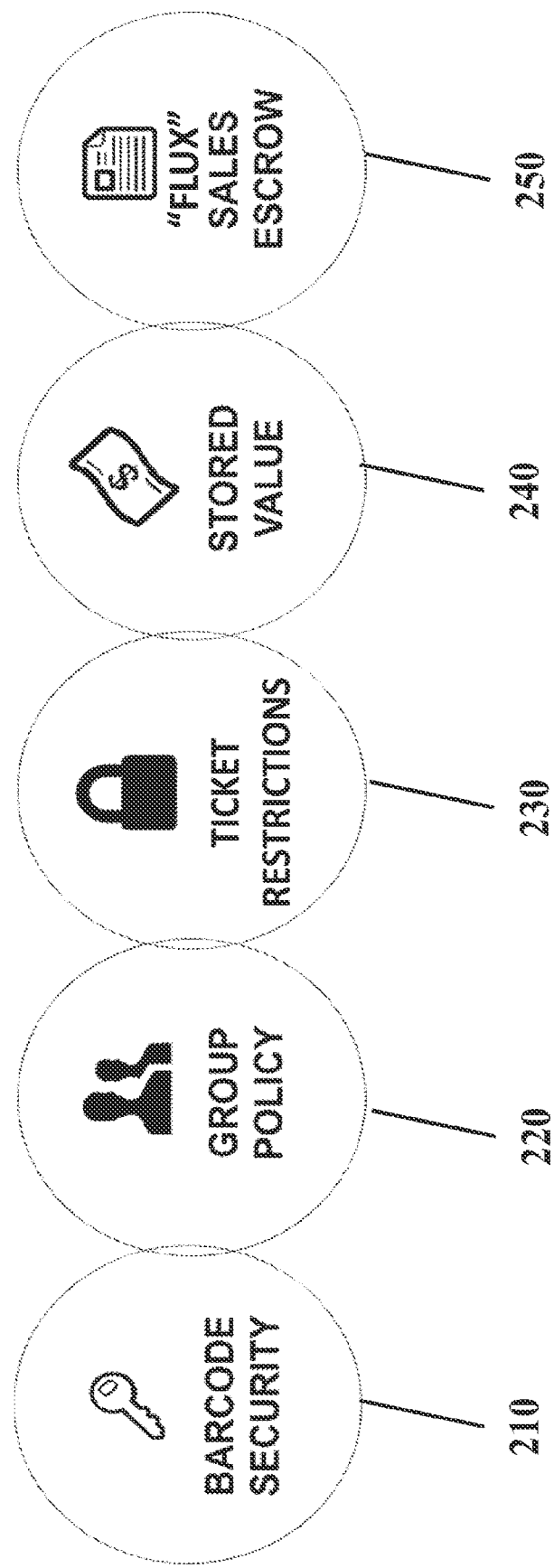
FIG. 2 illustrates the main features of a digital asset in the system.
Figure 3:
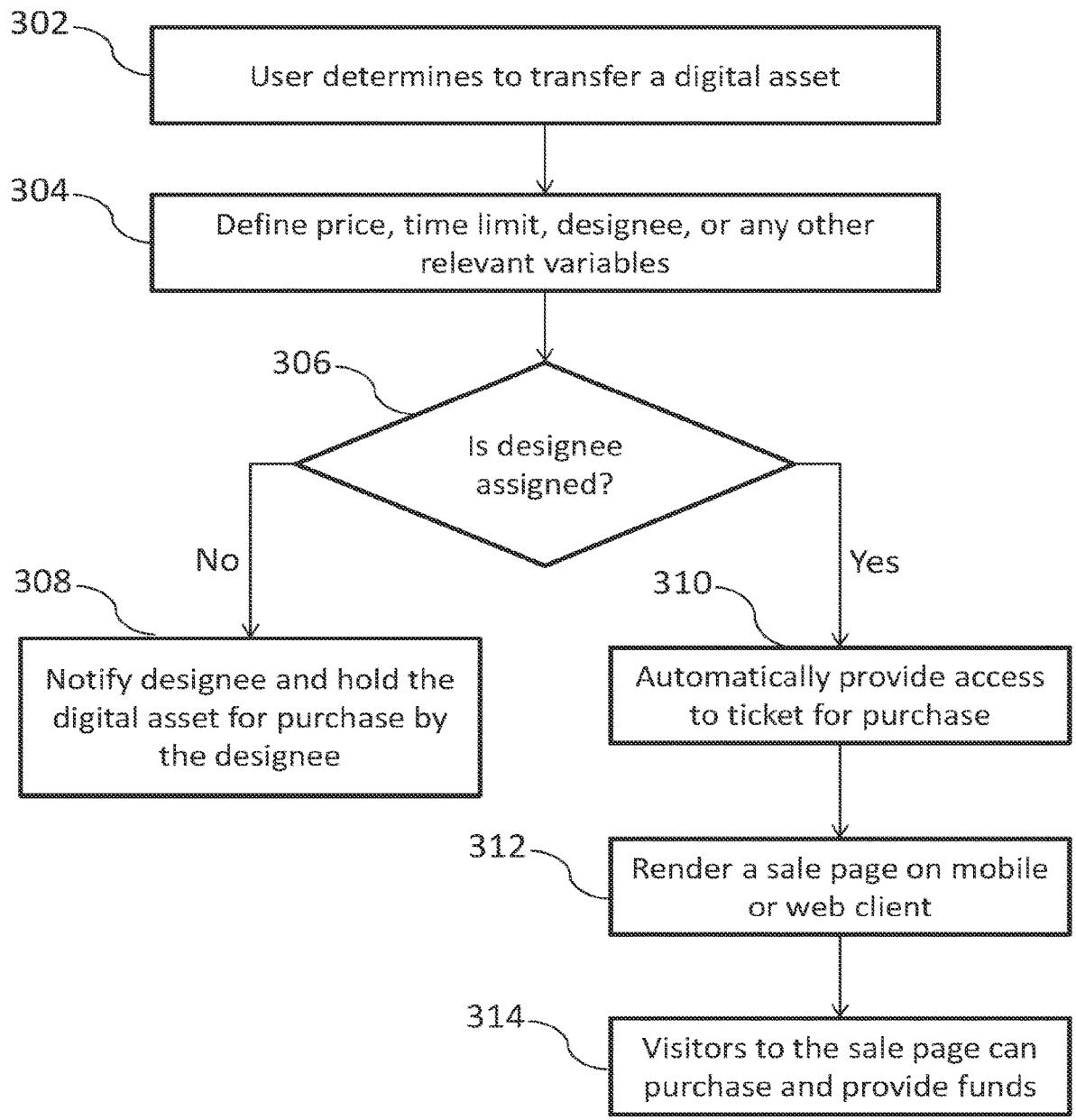
FIG. 3 illustrates a method for transferring digital assets in the system.
Figure 4:
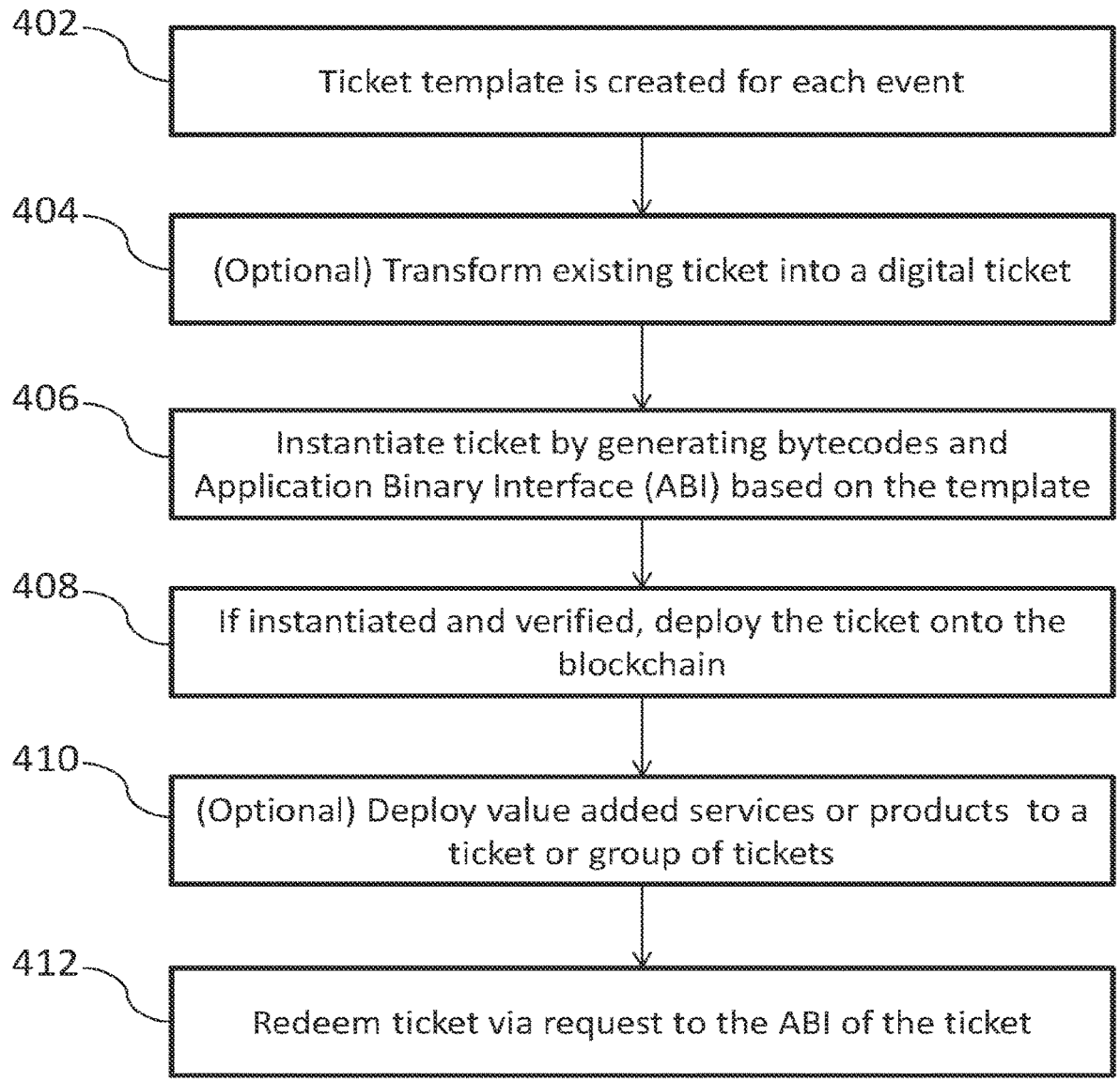
FIG. 4 illustrates a lifecycle of the digital assets in the system.

FIG. 2 illustrates the main features of a digital asset in the system. While every ticket can be uniquely designed to address the needs of the specific event, there may be a core set of features that represent the base class of every ticket, such as the following: Barcode Security (Storage and Obfuscation) 210, Group Policy 220, Ticket (Contract) Restrictions 230, Stored Value Extensions 240, and Automated Sales Escrow including "Flux" 250.

To maintain compatibility with existing legacy systems, every ticket still needs an associated barcode or other identifying information to ensure entry at the venue. This becomes a challenge as the barcode represents the ultimate vulnerability. The system may ensure the barcode and associated string is removed from the ticket and securely stored until absolutely necessary.

This system may account for this by removing the barcode and securely storing it on the blockchain, thereby obfuscating its presence from unnecessary inspection and potential duplication. Access to the barcode may be limited to a policy set by the creator of the ticket, which may not only include the proper authentication credentials, but also enforce spatial and temporal requirements from a known authority to ensure that the attendee that requires the barcode is actually at the event and entry is allowable (e.g., which may be limited to 90 minutes to 2 hours before the start of the event). The system may ensure that the attendee is at the event via a geofence delivered from global positioning system (GPS) coordinates, for example.

Generally, limiting the time to sell a popular ticket makes it more likely the ticket won't be sold on the open market. In addition, by requiring the user to be within the geofence of the stadium, it is far more likely that the intent of the user is to view the event, as opposed to the hundreds of sellers who seek to maximize profits from thousands of miles away. By representing the ticket as a public/private key digital asset, sale or transfer can be done safely and securely without the need for a barcode. This can be from a paper ticket or a digital ticket, but the barcode needs to be valid and unique and no other copies can exist for the system to operate correctly.

This "tokenization" of the ticket now may allow the owner of the ticket to perform specific actions with the ticket around the transfer and redemption of the ticket. However, to provide maximum security and benefit for the ticket, the ticket is to be generated and registered on the blockchain. The event owner that generates the ticket can embed the barcode and provide requirements that allow the barcode to be exposed.

The digital asset resulting from tokenization sits on a blockchain, enabling transfer in commerce through that blockchain without exposing the main element of the ticket. Similar to the popular Internet currency Bitcoin, a ticket can be transferred along only one chain. In addition, it generally requires the private key from an authorized owner to transact the ticket.

However, the system may allow different granularities of security for multiple levels of authorization.

In cases in which every ticket issued has its own unique set of policies, attributes, functionality, etc. may be unruly if managed for all tickets across a central server. But with the system, everything associated with the digital asset may travel together as a package. Traditional systems are optimized for uniform objects. Distributed systems like blockchains and do well with inconsistent, flexible structures.

GroupPolicy

As mentioned earlier, an event ticket can have more actors with access to the ticket than a traditional Bitcoin. Because the ticket often represents a license as opposed to actual ownership, the issuer of the ticket generally needs to maintain some control over the ownership of the ticket. Therefore, if a ticket holder violates the terms of the ticket, the issuer of the ticket may reserve the right to rescind the ticket and revert ownership back to itself. In addition, as part of escrow services that may require arbitration, the owner of the system may need to perform administrative actions on the ticket. This requirement of multiple security roles can be met by the system by linking the smart contracts together.

Every function can be modified with an access control list. If an unauthorized actor attempts to access the function, an exception may occur and the transaction may be rejected. In order to scale this group policy across multiple tickets as well as multiple events, a separate smart contract can be devised to hold the identities of everyone within the group. These groups can also vary when it comes to ownership eligibility.

Contract Restrictions

Conventionally, once the initial issuer of the ticket sells a ticket to a buyer, it becomes very difficult to track what happens with that ticket. Beyond simple fraud, the exchange of tickets cannot be easily regulated or monitored. Issuers have often been required to negotiate with secondary market providers in order to put provisions in place, such as price floors or price ceilings. Some states have passed laws regulating the ability for ticket holders to markup tickets upon resale. It is nearly impossible to monitor this, however, and laws are often skirted in order for the seller to maximize his or her profit.

When the transactions, including commerce, are managed via the blockchain and associated smart contract functionality, it generally becomes more difficult to skirt the above-mentioned restrictions. Establishing policies within the ticket can ensure automatic enforcement of policies throughout the lifecycle of the ticket. Leveraging the same strategy as the security model for group policy, each ticket can also restrict ownership as well, requiring that the owner be included in a special interest group as defined by the ticket group contract. In many cases, event owners may not concern themselves with who attends the event. However, sometimes tickets are specifically allocated for special-interest groups, and the security scheme employed by this system can ensure that the final ticket holder belongs to the group and/or is attending the event with someone from the group. This can be significant in scenarios such as corporate tickets, student sections at universities, or fan clubs that designate tickets specifically for devoted fans. While most attendees are excited by any such designation and status, the lure of scalper dollars can often cause them to choose to sell the tickets and repurchase cheaper versions, making a profit in the process.

Stored Value Extensions

Tickets rarely operate in a vacuum. In addition to admission to the event, attendees often obtain parking passes or vouchers for merchandise or concessions. There is clear convenience to combining these certificates or vouchers with the original ticket of the event where those stored value items may be used. By doing so, they may remain portable through transactions, be easily trackable in the redemption, trackable by their tie to an identity, and dynamic in their issuance. Additionally, the event owner may enable promotions where everyone in a certain section wins a prize. The distribution of that prize can be facilitated by automatically issuing the certificate directly to the ticket. That way, the same mechanism that may allow an attendee to access their ticket will also allow them to access these additional items of value.

Automated Sales Escrow, Including Flux

When a user wishes to transact with the ticket, it may require the public key to be able to perform read operations and a private key to be able to transact for the ticket, for example, to redeem the ticket at the game, or to transfer the ticket to another person. In some embodiments, there are four modalities of ticket transfer that can be covered by this algorithm: 1) Payback: A user wishes to transfer the ticket to a specific person, but expects compensation for that ticket; 2) Gift: A user wishes to transfer ticket to specific person, but does not require any compensation for the ticket; 3) Open Sale: A user wishes to place the ticket on the open market, expecting compensation for the ticket, in some cases caring about who the final owner of the ticket is; 4) Giveaway: A user puts the ticket up for sale and is unconcerned about future ownership or compensation.

A ticket may be placed on the open market by the system using an ownership state called "Flux." Flux can place the ticket into an indeterminate state, transfers the ticket into the custody of the system, and makes the ticket eligible for sale on any marketplace-including those directly supported by the system. The user who owns the ticket may have the option to remove the ticket from sale before the transaction. However, the transaction may be subject to the same requirements as a traditional sale. Therefore, if another transaction occurs beforehand that requires the ticket, the original owner of the ticket may not rescind the transaction. The blockchain timestamp may serve as the final arbiter of which event (sale or retraction) happened first.

As an option of the transfer, the ticket can be placed into sale via the flux mechanism. The process of "Flux" is as follows.

In some embodiments, a user may initially place Digital Tickets into "Flux" 302, defining various variables for the ticket, including but not limited to price, time limit, designee (which may be optional), and the like 304. The administrator (of the system) may take ownership of the ticket and authorize transfer to an "Escrow" account. The original owner may now be flagged as a "Flux Owner". In some embodiments, the system may be configured to check whether or not a designee is assigned (process 306). If a designee is assigned (such as when one user purchases a ticket on behalf of acquaintance friend being the designee, but expects reimbursement for purchase), that person may receive a notification that a ticket is waiting for reserved purchase (308). If no designee is assigned, the ticket may be up for sale to anyone and access to ticket purchase can be revealed using the methods below.

As a next step, the system can automate access to ticket for purchase 310. In some embodiments, a mobile web client server code may render a sale page, which can be shared with all potential purchasers in an open market 312. In addition, the Native Wallet client can access the sales data and facilitate the transaction with a richer user experience. Visitors who come to the page can purchase the ticket and provide funds 314. The system's administrator may execute a transaction against the blockchain and release the funds to the original owner of the ticket once the transaction is confirmed. If the transaction is rejected due to a double-spend error or other previous transfer, the funds for purchase may return to the buyer.

Alternately, a third party can conduct the transaction via the application programming interface (API) provided by the system and manage the interaction with the buyer in their own user interface (UI).

In some embodiments, if the original owner wishes to remove the ticket sale, he may authorize the transaction as if he is repurchasing the ticket for zero dollars, as authorized by the administrator in charge of escrow. However, if the ticket has been purchased before the sale has been rescinded, the ticket may go to the buyer. The blockchain may serve as the final arbiter using the timestamp data as the sole decision point. The first transaction wins.

Ticket Lifecycle

Template Creation

For every event, a ticket template can be created (process 402). This template may encompass the main components that are likely to be used for that corresponding event. The template may provide functionality for the distribution, transfer, sale, and redemption of the ticket. These are generally the core functions that are required of every ticket. The code can then be extended to create policies on ownership and sales prices, instituting authorization on who can access or manage the ticket as well as price floors and ceilings. An array reference holder may serve as a placeholder for potential stored value items to be added.

Implementation-wise, once the ticket structure is defined in code, a compiler may create the corresponding byte codes as well as an interface string that will be used for the creation and manipulation of the ticket. This enables the middleware of the application to interface effectively with the blockchain. The interface string may be required to instantiate a ticket as well as a reference to access the functionality of the ticket throughout its lifecycle.

To convert an existing ticket into in a digital ticket, the relevant data may be extracted from the ticket (process 404). In the case of redundant data that is not specific to the ticket (such as information about the event that is not required to validate any ticket functionality), the Helper Cache may store this information and tie it to a common Event ID. The ID may be stored in the ticket on the blockchain and, when retrieved, perform a lookup to get the information. This may allow the data to be stored and modified in one location as opposed to tens of thousands of locations for a large event. Furthermore, this may take additional burden off of the blockchain, and less data may need to be stored and fewer computer resources will be required to maintain the ticket data.

Tokenization and Securitization

An event owner can issue directly or an issuer can convert existing verified voucher into digital asset via securitization process. This may be akin to the government using the "gold standard" to issue Demand Notes to pay expenses, which may be redeemable on demand for gold coin at the Treasury. The system may be issuing the "ticket standard" and these digital assets may be "demand notes" for physical tickets that can be redeemed at the event.

The process of creating a "ticket standard" may require taking the original ticket, ensuring that there is no other copy of the ticket (digital or printed) and the information on the ticket has not been secured already. Once that has been confirmed, the main information may be extracted from the ticket and disseminated in the appropriate data store. The information may likely be broken up like this:

| Event Reference Database | Ticket On blockchain |
|---|---|
| Event ID | Event ID (reference to Event DB) |
| Event Information | Ticket Seat Information (Section, Row, Seat) |
| Graphics/Artwork | Barcode for Entry |
| Sponsor/advertiser Information | Ticket-Specific Codes (if any) |

To generate a ticket and place it on the blockchain, the system may take the template and have the corresponding bytecodes and Application Binary Interface (ABI) (process 406). The bytecodes and ABI may be generated by a complier and stored for future reference. For a specific event, it is likely (but not a requirement) that all tickets share the same template, so generating the bytecodes and ABI may not be required for every single ticket. Also, a determination may need to be made on who the "event owner" is for each ticket and whether that may differ in tickets for the same event or if that authority may be modified during the lifetime of the ticket. The administrator of the ticket, which is assumed to be the "user" that creates the ticket, may be inferred from invocation of the ticket creation routine and assigned accordingly. Creating the ticket may give the creator ultimate authority over the governance of the ticket. Once the ticket has been instantiated and verified to have been properly deployed onto the blockchain, the address is generally stored in a digital wallet to track ownership (process 408). The address and ABI will be required for any future transaction.

Extensions

Every ticket template may reserve a reference for a hash table where stored value "cards" can be easily deployed (process 410). In this case, the issuing authority may be assigned a globally unique hash address that can be referred. When value is issued, the issuing authority may notify the administrator, who is given the ability to issue value on behalf of the issuer. The value can be a dollar amount, a credit/debit card number, or even a barcode representing a coupon.

Therefore, for example, if a local pizza place wishes to provide $5 coupons to a specific set of customers, they work with the event owner and/or administrator to identify the target audience (e.g., users who are sitting in Section 242). The administrator may generate a unique address N dedicated to the promotion, identify all tickets under management that fit their criteria (Section 242), and call the function enabled by the ticket template to issue the credit to the stored value hash table at location N with either the value "5" or a barcode for a coupon that can be scanned at the establishment. This can work for promotions, parking, concessions, etc. and can be modified at any time due to the flexible nature of the architecture—though care should be taken to not overload the ticket and bog down the blockchain with too many extensions.

Redemption

When the ticket is within the geofence of the event and the countdown has begun to the game, the ticket may be ready for unlocking. A user may make a request to activate the ticket, and the application may acquire the geo coordinates, review the distance and time requirements, and (assuming the requirements are met) pass the request to the ABI of the ticket. The ABI may double-check the time versus the server timestamp and then unlock the ticket (process 412).

This may include reverting the barcode data of the ticket to the client for display, shutting down any transfer capability, and reverting transfer authority to the administrator. The user may still be able to access the ticket information (including stored value items, of course), but will no longer have the ability to change owners or sell tickets.

Computer Systems

Figure 5:
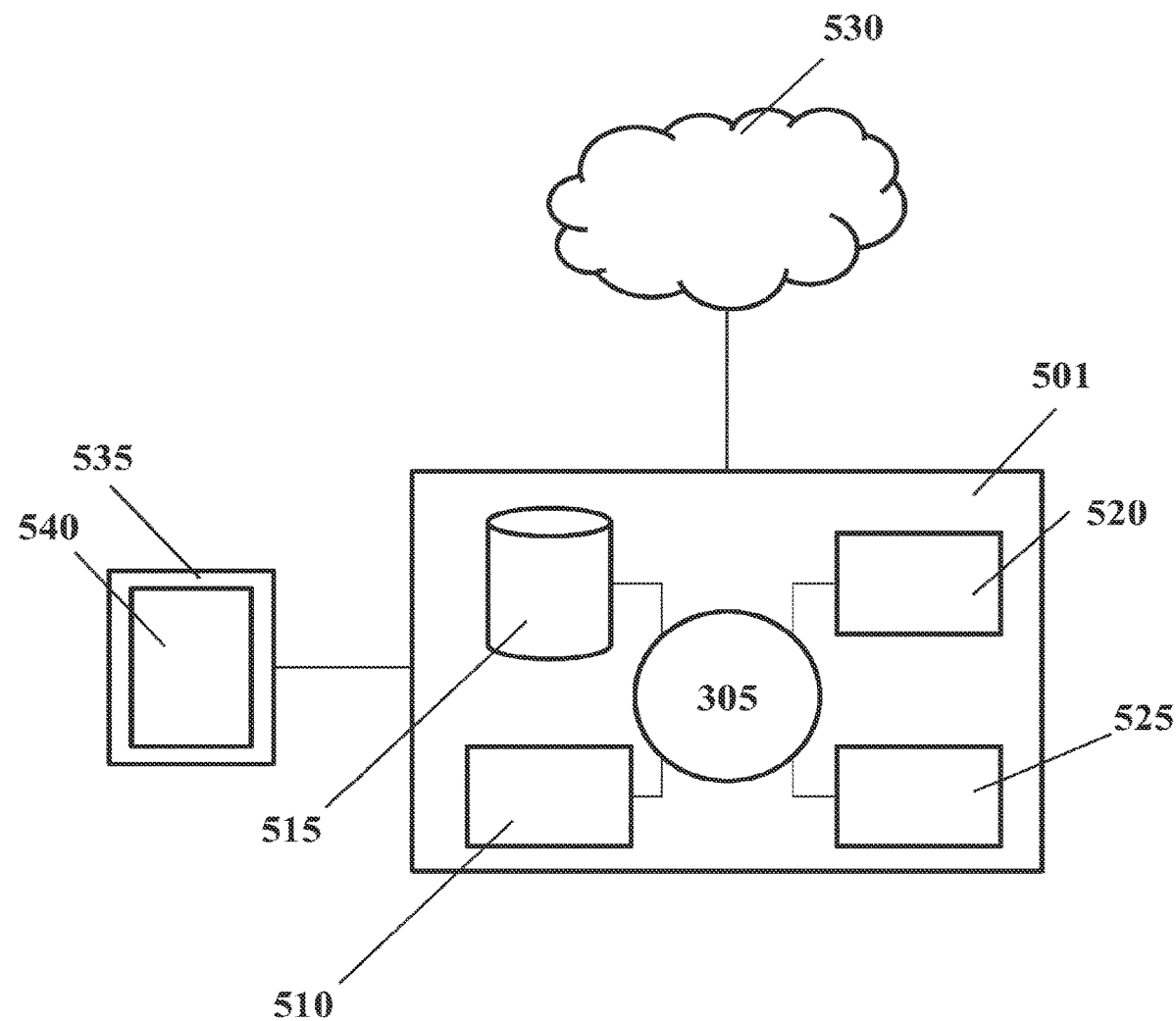
FIG. 5 shows a computer system that is programmed or otherwise configured to implement methods provided herein.

The present disclosure provides computer systems that are programmed to implement methods of the disclosure. FIG. 5 shows a computer system 501 that is programmed or otherwise configured to implement an event ticket securitization system. The computer system 501 can regulate various aspects of the system of the present disclosure, such as, for example, obfuscating barcodes, enforcing multi-level security authorization, and incorporating stored-value extensions. The computer system 501 can comprise a mobile phone, a tablet, a wearable device, a laptop computer, a desktop computer, a central server, etc.

The computer system 501 includes a central processing unit (CPU, also "processor" and "computer processor" herein) 505, which can be a single core or multi core processor, or a plurality of processors for parallel processing. The computer system 501 also includes memory or memory location 510 (e.g., random-access memory, read-only memory, flash memory), electronic storage unit 515 (e.g., hard disk), communication interface 520 (e.g., network adapter) for communicating with one or more other systems, and peripheral devices 525, such as cache, other memory, data storage and/or electronic display adapters. The memory 510, storage unit 515, interface 520 and peripheral devices 525 are in communication with the CPU 505 through a communication bus (solid lines), such as a motherboard. The storage unit 515 can be a data storage unit (or data repository) for storing data. The computer system 501 can be operatively coupled to a computer network ("network") 530 with the aid of the communication interface 520. The network 530 can be the Internet, an internet and/or extranet, or an intranet and/or extranet that is in communication with the Internet. The network 530 in some cases is a telecommunication and/or data network. The network 530 can include one or more computer servers, which can enable distributed computing, such as cloud computing. The network 530, in some cases with the aid of the computer system 501, can implement a peer-to-peer network, which may enable devices coupled to the computer system 501 to behave as a client or a server. The CPU 505 can execute a sequence of machine-readable instructions, which can be embodied in a program or software. The instructions may be stored in a memory location, such as the memory 510. The instructions can be directed to the CPU 505, which can subsequently program or otherwise configure the CPU 505 to implement methods of the present disclosure.

Examples of operations performed by the CPU 505 can include fetch, decode, execute, and writeback.

The CPU 505 can be part of a circuit, such as an integrated circuit. One or more other components of the system 501 can be included in the circuit. In some cases, the circuit is an application specific integrated circuit (ASIC).

The storage unit 515 can store files, such as drivers, libraries and saved programs. The storage unit 515 can store user data, e.g., user preferences and user programs. The computer system 501 in some cases can include one or more additional data storage units that are external to the computer system 501, such as located on a remote server that is in communication with the computer system 501 through an intranet or the Internet.

The computer system 501 can communicate with one or more remote computer systems through the network 530. For instance, the computer system 501 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 501 via the network 530. Methods as described herein can be implemented by way of machine (e.g., computer processor) executable code stored on an electronic storage location of the computer system 501, such as, for example, on the memory 510 or electronic storage unit 515. The machine executable or machine readable code can be provided in the form of software. During use, the code can be executed by the processor 505. In some cases, the code can be retrieved from the storage unit 515 and stored on the memory 510 for ready access by the processor 505. In some situations, the electronic storage unit 515 can be precluded, and machine-executable instructions are stored on memory 510.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 501, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium, or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 501 can include or be in communication with an electronic display 535 that comprises a user interface 540 for providing, for example, a management interface.

Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 505.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A computer-implemented method for creating a digital ticket for an event, the computer-implemented method comprising:
   creating, by one or more processors of a system, a template for a ticket for the event, wherein:
      the ticket is a physical ticket, and
      the template for the ticket comprises a set of policies for:
         distribution, transfer, and redemption of the ticket,
         managing ownership of the ticket,
         managing access for the ticket, and
         restricting one or more parameters associated with the ticket,
   extracting, by the one or more processors, data from the ticket, wherein the data includes the one or more parameters associated with the ticket;

associating, by the one or more processors, the data extracted from the ticket with a unique identifier of the event;
determining, by the one or more processors, a presence or an absence of a copy of the ticket in a database;
creating, by the one or more processors, bytecodes and application binary interface (ABI) based on the template of the ticket, wherein the bytecodes and the ABI is created in response to determining that the copy of the ticket is absent;
creating, by the one or more processors, the digital ticket using the bytecodes and the ABI;
deploying, by the one or more processors, the digital ticket to a blockchain system;
receiving, by the one or more processors, a request to unlock the digital ticket along with a current location of the digital ticket and a time left for starting the event;
passing, by the one or more processors, the request to the ABI; and
unlocking, by the one or more processors, the digital ticket when the current location of the digital ticket is within a geofence of a venue of the event and the time left for starting the event is within a predetermined time left for the event to begin.

2. The computer-implemented method of claim 1, further comprising: restricting, by the one or more processors, a transfer of the digital ticket when the digital ticket is not within the geofence of the venue of the event and the time left for starting the event is not within the predetermined time left for the event to begin.

3. The computer-implemented method of claim 1, further comprising: deploying, by the one or more processors, one or more stored value extensions, wherein each of the one or more of stored value extensions represents a certificate or voucher that is usable with the digital ticket.

4. The computer-implemented method of claim 1, further comprising: a public key for performing read operations on the digital ticket; and a private key to transact for the digital ticket.

5. The computer-implemented method of claim 1, further comprising: extracting, by the one or more processors, an address of the digital ticket on the blockchain system, wherein the address is used to track ownership of the digital ticket; and storing, by the one or more processors, the address of the digital ticket in a digital wallet.

6. The computer-implemented method of claim 1, wherein: the template reserves a reference for a hash table for deploying one or more extensions; and the hash table is used to identify one or more tickets associated with the one or more extensions.

7. The computer-implemented method of claim 1, wherein the set of policies enforces single-user ownership and multi-role access of the digital ticket.

8. A non-transitory computer-readable storage medium having stored thereon instructions for creating a digital ticket for an event, the instructions comprising:
creating a template for a ticket for the event, wherein:
the ticket is a physical ticket, and
the template for the ticket comprises a set of policies for:
distribution, transfer, and redemption of the ticket,
managing ownership of the ticket,
managing access for the ticket, and
restricting one or more parameters associated with the ticket,
extracting data from the ticket, wherein the data includes the one or more parameters associated with the ticket;
associating the data extracted from the ticket with a unique identifier of the event;
determining, by the one or more processors, a presence or an absence of a copy of the ticket in a database;
creating bytecodes and application binary interface (ABI) based on the template of the ticket, wherein the bytecodes and the ABI is created in response to determining that the copy of the ticket is absent;
creating the digital ticket using the bytecodes and the ABI;
deploying the digital ticket to a blockchain system;
receiving a request to unlock the digital ticket along with a current location of the digital ticket and a time left for starting the event;
passing the request to the ABI; and
unlocking the digital ticket when the current location of the digital ticket is within a geofence of a venue of the event and the time left for starting the event is within a predetermined time left for the event to begin.

9. The non-transitory computer-readable storage medium of claim 8, further comprising: restricting a transfer of the digital ticket when the digital ticket is not within the geofence of the venue of the event and the time left for starting the event is not within the predetermined time left for the event to begin.

10. The non-transitory computer-readable storage medium of claim 8, further comprising: deploying one or more stored value extensions, wherein each of the one or more of stored value extensions represents a certificate or voucher that is usable with the digital ticket.

11. The non-transitory computer-readable storage medium of claim 8, further comprising: a public key for performing read operations on the digital ticket; and a private key to transact for the digital ticket.

12. The non-transitory computer-readable storage medium of claim 8, further comprising: extracting an address of the digital ticket on the blockchain system, wherein the address is used to track ownership of the digital ticket; and storing the address of the digital ticket in a digital wallet.

13. The non-transitory computer-readable storage medium of claim 8, wherein: the template reserves a reference for a hash table for deploying one or more extensions; and the hash table is used to identify one or more tickets associated with the one or more extensions.

14. The non-transitory computer-readable storage medium of claim 8, wherein the set of policies enforces single-user ownership and multi-role access of the digital ticket.

15. A system for creating a digital ticket for an event, the system comprising:
one or more processors; and
memory coupled with the one or more processors, the memory configured to store instructions that when executed by the one or more processors cause the one or more processors to:
create a template for a ticket for the event, wherein:
the ticket is a physical ticket, and
the template for the ticket comprises a set of policies for:
distribution, transfer, and redemption of the ticket,
managing ownership of the ticket,
managing access for the ticket, and
restricting one or more parameters associated with the ticket, extract data from the ticket, wherein the data includes the one or more parameters associated with the ticket;

associate the data extracted from the ticket with a unique identifier of the event;

determine, by the one or more processors, a presence or an absence of a copy of the ticket in a database;

create bytecodes and application binary interface (ABI) based on the template of the ticket, wherein the bytecodes and the ABI is created in response to determining that the copy of the ticket is absent;

create the digital ticket using the bytecodes and the ABI;

deploy the digital ticket to a blockchain system;
   receive a request to unlock the digital ticket along with a current location of the digital ticket and a time left for starting the event,
   pass the request to the ABI; and
   unlock the digital ticket when the current location of the digital ticket is within a geofence of a venue of the event and the time left for starting the event is within a predetermined time left for the event to begin.

16. The system of claim 15, the one or more processor further configured to: restrict a transfer of the digital ticket when the digital ticket is not within the geofence of the venue of the event and the time left for starting the event is not within the predetermined time left for the event to begin.

17. The system of claim 15, the one or more processor further configured to: deploy one or more stored value extensions, wherein each of the one or more of stored value extensions represents a certificate or voucher that is usable with the digital ticket.

18. The system of claim 15, further comprising: a public key for performing read operations on the digital ticket; and a private key to transact for the digital ticket.

19. The system of claim 15, the one or more processor further configured to: extract an address of the digital ticket on the blockchain system, wherein the address is used to track ownership of the digital ticket; and storing the address of the digital ticket in a digital wallet.

20. The system of claim 15, wherein: the template reserves a reference for a hash table for deploying one or more extensions; and the hash table is used to identify one or more tickets associated with the one or more extensions.

* * * * *